United States Patent [19]

Schiffer

[11] Patent Number: 5,559,531

[45] Date of Patent: Sep. 24, 1996

[54] CONTROL UNIT FOR AN INJECTION MOULDING MACHINE

[75] Inventor: Alfred Schiffer, Neustadt/Wied, Germany

[73] Assignee: Dr. Boy GmbH, Germany

[21] Appl. No.: 237,194

[22] Filed: May 3, 1994

[30] Foreign Application Priority Data

May 12, 1993 [DE] Germany .............. 43 15 902.8

[51] Int. Cl.$^6$ ................................................. G09G 5/00
[52] U.S. Cl. ................ 345/168; 345/905; 248/917
[58] Field of Search ................. 364/708, 709.12, 364/709.13, 709.14, 709.15; 361/680, 681; 248/918, 917; 345/168, 905; 341/22; 348/842, 838

[56] References Cited

U.S. PATENT DOCUMENTS

| | | | |
|---|---|---|---|
| 3,062,917 | 11/1962 | Rose | 348/842 |
| 3,538,250 | 11/1970 | Franklin, Sr. | 348/838 |
| 4,310,839 | 1/1982 | Schwerdt | 341/22 |
| 4,667,299 | 5/1987 | Dunn | 361/680 |
| 4,896,370 | 1/1990 | Kasparian et al. | 345/168 |
| 5,107,402 | 4/1992 | Malgouires | 361/680 |
| 5,260,885 | 11/1993 | Ma | 361/681 |
| 5,348,324 | 9/1994 | Trotta | 248/917 |

*Primary Examiner*—Mark R. Powell
*Assistant Examiner*—Matthew Luu
*Attorney, Agent, or Firm*—Blakely Sokoloff Taylor & Zafman

[57] ABSTRACT

The control unit has a screen which is flanked on both sides by function key sets for controlling the functional sequence of the machine. A keyboard for inputting data into the processor of the control unit is arranged on a pivotal flap. The latter is so mounted about a horizontal axis below the screen that, in the unused state of the keyboard, it may be swung onto the screen and protectively covers the latter, at least in the lower region. A second pivotal flap is pivotably mounted in the upper region of the control unit above the screen and can be folded down for protecting the upper region of the screen. The second pivotal flap can furthermore be used for anti-dazzle protection for partially shading the screen from undesired dazzling light.

7 Claims, 2 Drawing Sheets

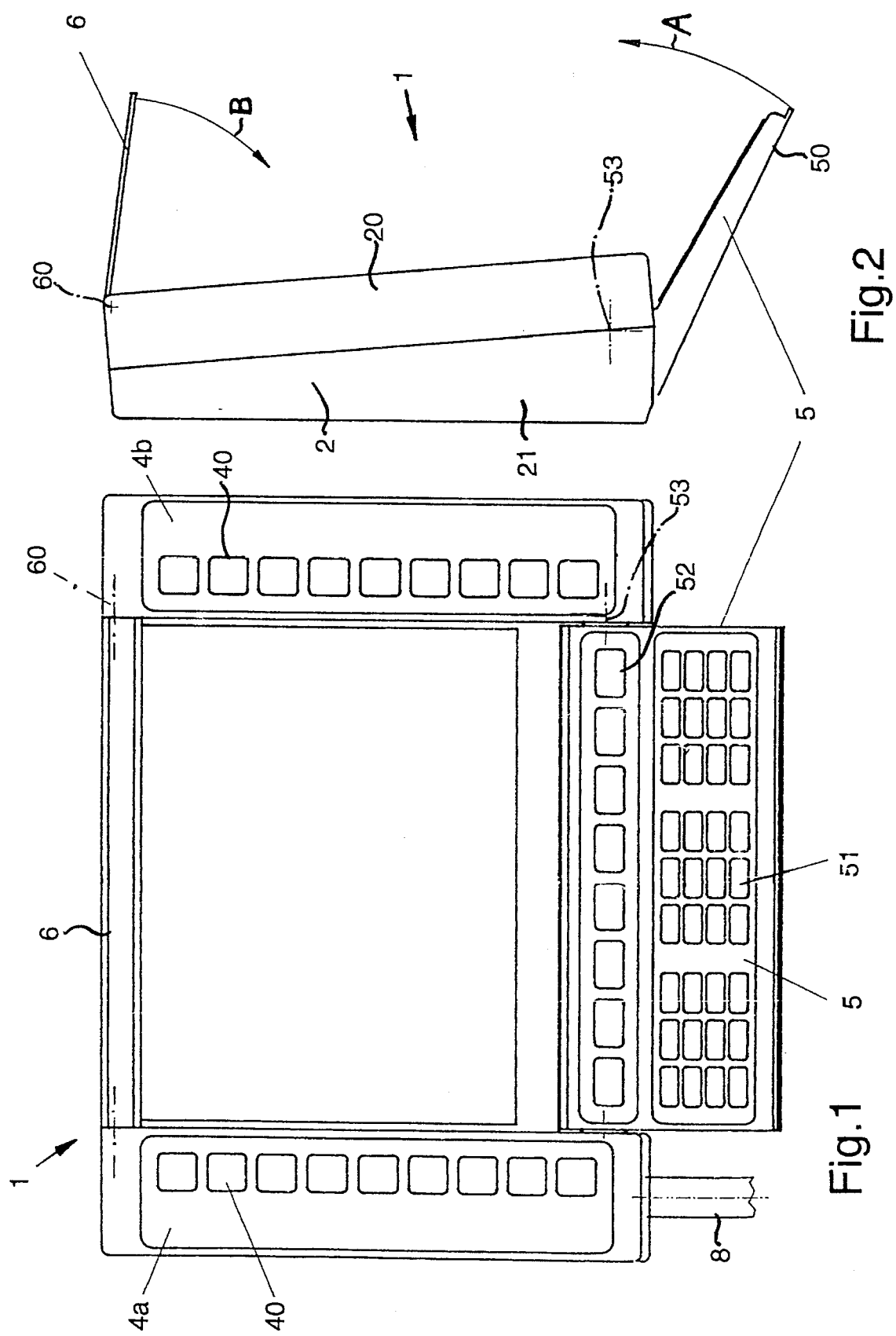

CONTROL UNIT FOR AN INJECTION MOULDING MACHINE

BACKGROUND OF THE INVENTION

1. Field of the Invention

The invention relates to a control unit for an injection moulding machine or the like with a keyboard for inputting data and at least one function key set for controlling the operation of the machine.

2. Prior Art

With modern injection moulding machines the injection moulding conditions and the operation or sequence of the machine are computer controlled. When changing moulded components produced under mass production conditions it is necessary for new data and parameters for the production process to be established and stored. This generally occurs by way of a separate key set. Interventions in the production sequence on the other hand are performed by way of at least one further function key set.

A screen in the nature of a monitor, for instance a liquid crystal or plasma screen, can be used with computer controlled injection moulding machines as a display or indicating device. Data input during the setting up process, monitoring information and even a complete menu can be displayed on it. The use of a screen is, however, not possible without problems under the relatively rough production conditions in operational use of an injection moulding machine. The screen has a large working surface and is particularly sensitive to impacts in the screen region. However, damage to the screen conceals an additional risk of personal danger.

Tests conducted by the applicant have shown that mechanical damage of the sensitive front side of the screen when actuating the control unit and when retrieving information via the screen occurs only seldom, if at all. When inputting and retrieving information the operative concentrates on viewing the screen. This basically gentle treatment of the sensitive screen consequently coincides with those times at which the screen exhibits its greatest usefulness; that is during the inputting of data during the setting up of the functional process of the injection moulding machine. During the production sequence of the machine, which is generally automatic, on the other hand, little current information is required and displayed. During these substantially more extended and more frequent phases the probability of mechanical stressing of the control unit by uncontrolled impacts or movements of the operative is highest by a long way.

THE INVENTION

It is the object of the invention to utilise the high operating and information comfort of the screen for the control unit of injection moulding machines without exposing the operatives and control unit to increased risks of injury or damage.

In a control unit of the type referred to above this objection is solved in accordance with the invention if the keyboard is secured to a flap, which is pivotally mounted at the lower end of a screen and, in the unused state, may be folded against the screen such that the flap and/or keyboard protectively covers at least the lower region of the screen; and if on at least one side of the screen a function key set is arranged in a fixed relationship with the screen such that the function keys are freely accessible and actuable, even when the screen is covered.

The control unit in accordance with the invention makes available to the operatives of the injection moulding machine, at least for the input and checking of data during the setting up and storage, the screen display which is the optimum for this purpose. Confirmation of all the set functional steps can be made on the one hand and a user friendly menu presentation can be made visible on the other hand on the screen by means of the computer. The entire control unit, that is to say including the screen to be protected from mechanical damage, can be fixedly associated with the injection moulding machine at an ergonomically favourable position. During the unused condition, the flap carrying the keyboard is simply flapped over against the screen; thus it is not used in the subsequent (substantially automatic) production sequence. The flap carrying the keyboard can be constructed without substantial expenditure from a material fulfilling the necessary protective function and in an appropriate shape. It is frequently sufficient to cover the screen only partially by the flap, namely in the lower region. The screen is subjected particularly frequently at that position to mechanical damage by incorrect usage of tools and instruments. Furthermore, an open slot along the upper edge of the screen provides the possibility of making current production steps visible.

A yet further improved protection against mechanical damage may be achieved in a further embodiment of the invention if a second pivotal flap is pivotably arranged in the upper region of the screen, whereby the pivotal axes of the two flaps extend parallel to one another, and if the two flaps substantially completely cover the screen in their position folded against the screen.

This second flap is very suitable as an anti-dazzle flap when using the screen and is adjustable for this purpose into different pivotal positions in order to screen light radiation matched to the local conditions.

The construction and arrangement of the function key sets for controlling the functional sequence of the machine are not limited by the invention. The function key sets can be arranged and constructed in a conventional manner. They can be arranged symmetrically on both sides of the screen matched to the control unit in accordance with the invention. It is frequently convenient for ergonomic reasons if, in accordance with a further embodiment of the invention, the two function key sets project towards the front side with respect to the folded in first and/or second flaps.

The invention will be explained below in more detail with reference to an exemplary embodiment illustrated schematically in the drawings.

BRIEF DESCRIPTION OF THE DRAWINGS

FIG. 1 is a front view of an exemplary embodiment of the new control unit in the position suitable for data input, FIG. 2 is a side view of the control unit of FIG. 1, and FIG. 3 a side view, on an enlarged scale with respect to FIG. 2, partly in section, of the control unit in a position which protects the screen from mechanical damage.

DETAILED DESCRIPTION OF THE INVENTION

Figure 3:
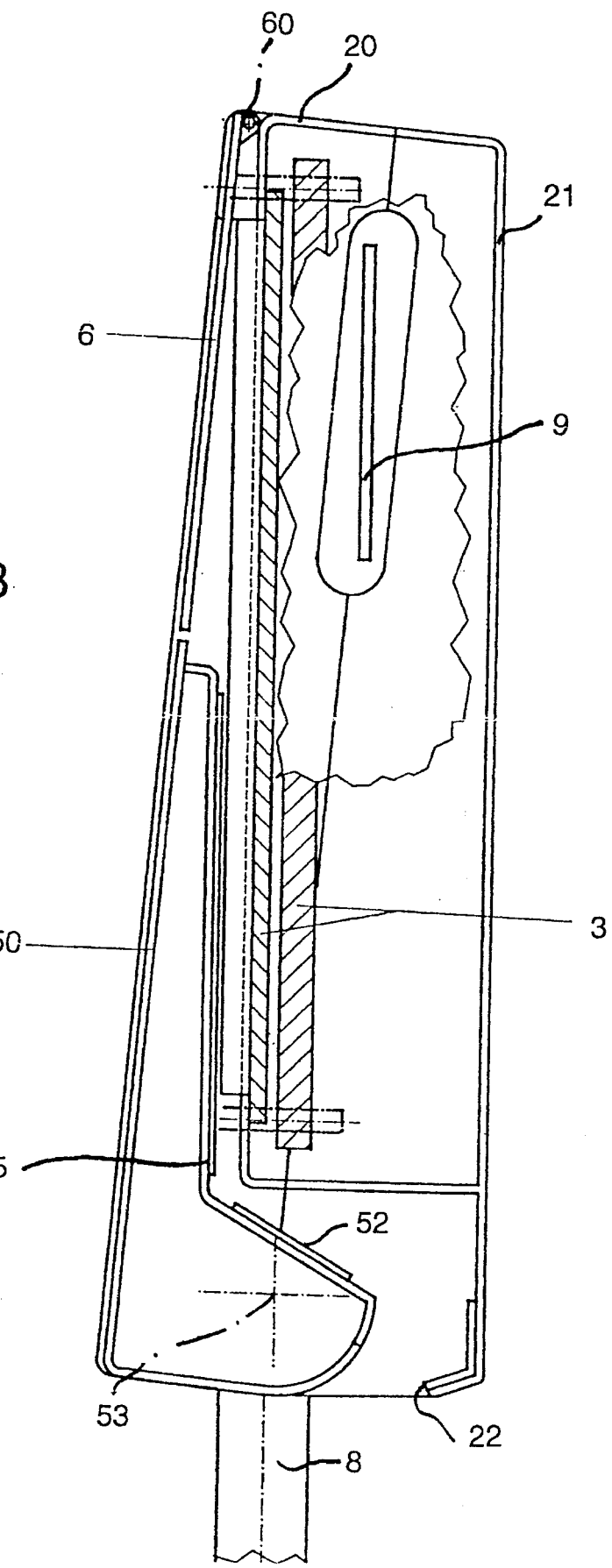

The control unit 1 shown in FIGS. 1 and 2 in front and side views has a housing 2, which is secured in a fixed spacial relationship to a support, which is not shown, of an injection moulding machine, with a front housing portion 20 and a rear housing portion 21. Incorporated in the housing 2 are components, similar to an intelligent terminal, of a data processing device and suitable stores which are not of importance in the context of the present invention. The front housing portion 20 accommodates a screen in the manner of a frame, which is currently generally constituted by a liquid crystal display, but which in principle can also be constructed as a plasma screen or in some other form. Disposed on the left and right-hand side of the screen in the front housing portion 20 are function key sets 4a and 4b which include the same number of function keys 40 in the illustrated exemplary embodiment.

The control unit has, as is usual with computer terminals, a keyboard 5, which is inclined in the operational state obliquely to the front side, with keys 51, 52 which are arranged in two sets inclined to one another. The keyboard 5 is disposed on a flap 50 and is mounted so as to be pivotable with it about a horizontal axis 53 arranged below the screen 3. As may be seen particularly clearly in FIG. 2, the keyboard 5 or pivotal flap 50 can be flapped back out of the functional position shown in FIGS. 1 and 2 in the direction of the arrow A in front of the screen 3 (FIG. 2). In this position the lower screen region, which is particularly at risk, is completely covered by the rear side of the flap which preferably consists of a plastics material which is insensitive to impacts.

Arranged above the screen is a second pivotal flap 6 which is pivotally mounted about a pivotal axis 60, which is also horizontal. In the raised state (FIGS. 1 and 2) the upper pivotal flap 6 is swung up above the upper edge of the screen so that the view of the screen is not impaired. By adjustment into a suitable pivotal position the second pivotal flap 6 may be used as a anti-dazzle protector against disruptive light rays coming from above. It can, however, also be completely swung inwardly in the direction of the arrow B. In the swung-in position of FIG. 3 the outer walls of the two flaps 5 and 6 constitute a nearly closed front wall lying in one plane which extends protectively over the screen 3. The upper pivotal flap 6 can also be swung up even when the lower pivotal flap 5 or 50 is closed (FIG. 2) and thus permit viewing of an upper strip of the screen. This has the advantage in the event of only a small risk of damage to the screen 3 that information relating to the machine process which is currently occurring can be conveyed to the operative via the upper portion of the screen. In an embodiment which is not shown in the drawings the upper portion of the screen can additionally be covered by a transparent protective sheet which can remain in position even when the flaps 5, 6 are swung up. The flap 6 can then be omitted or used as a simple anti-dazzle device.

The flap or keyboard 5 can be fixed in the swung-up position by an abutment 22 fixed to the housing. Provided in the side wall of the housing is a suitable receiving slot for a bulk store 9, for instance a program diskette, a magnetic card or the like. Wiring runs 8 form the signal connection to the machine and supply the control unit 1 with power.

Numerous modifications are possible within the scope of the inventive concept: thus the pivotal flap 50 carrying the keyboard 5 does not necessarily have an L-shaped cross-sectional shape (FIG. 3) but can also be simply constructed wedge-shaped and without the inclined key sets 51 and 52. Instead of the one-piece pivotal flap 50 two independently operable pivotal flaps can also be used as carriers for the keyboard. Both flaps are then preferably arranged on a horizontal pivotal axis 53. The pivotal flap 50 can also be provided in front of the screen 3 with louvres on the front side to increase and reinforce their protective function. Furthermore, the upper pivotal flap 6 can also be provided with a sliding guide which enables the pivotal flap 6 to slide back parallel to the upper surface of the housing 2.

I claim:

1. A control unit for an injection moulding machine, the control unit including the following features:

a screen a keyboard for inputting data which is secured to a first flap, the flap being pivotally secured to the control unit at a first pivotal axis arranged below the screen such that the keyboard, in the unused state, can adopt a raised position against the screen in which it covers at least a lower region of the screen; and a first function key set with function keys for controlling the functional sequence of the injection moulding machine, whereby the function key set is arranged on a first side of the screen in a fixed relationship to the latter such that the function keys are freely accessible and actuable, even when the screen is covered.

2. The control unit as claimed in claim 1, wherein a second flap is pivotable about a second pivotal axis arranged above the screen such that it can adopt a lowered position against the screen;

the first and second pivotal axes extend parallel to one another; and the keyboard and the second flap together substantially cover the screen in their positions folded against the screen.

3. The control unit as claimed in claim 2, wherein the second flap can adopt different pivotal positions so that it is usable also as an anti-dazzle flap for the screen.

4. The control unit as claimed in claim 1, wherein a second function key set is arranged on a second side of the screen symmetrically with the first function key set.

5. The control unit as claimed in claim 1, wherein the first flap projects in one direction from the first pivotal axis above the keyboard.

6. A control unit for an injection moulding machine, the control unit including the following features:

a screen facing a front side of the control unit;

a keyboard for data input fastened to a first flap which is pivotally secured to a first pivotal axis arranged below the screen such that the keyboard, in the unused state, can adopt a raised position against the screen in which it covers at least a lower region of the screen;

a second flap which is pivotable about a second pivotal axis arranged above the screen such that it can adopt a lowered position against the screen in which it covers at least an upper region of the screen;

a first function key set with function keys for controlling the functional sequence of the injection moulding machine, the function key set being so arranged on a first side of the screen in a fixed relationship with the latter that the function keys are freely accessible and actuable even when the screen is covered; and a second function key set which is arranged on a second side of the screen symmetrically with the first function key set.

7. The control unit as claimed in claim 6, wherein each function key set faces the front side of the control unit and projects beyond the first and second flaps with the flaps being folded against the screen.

\* \* \* \* \*